No. 688,776. Patented Dec. 10, 1901.
C. V. GREENAMYER.
CARBURETER.
(Application filed Dec. 28, 1900.)
(No Model.)
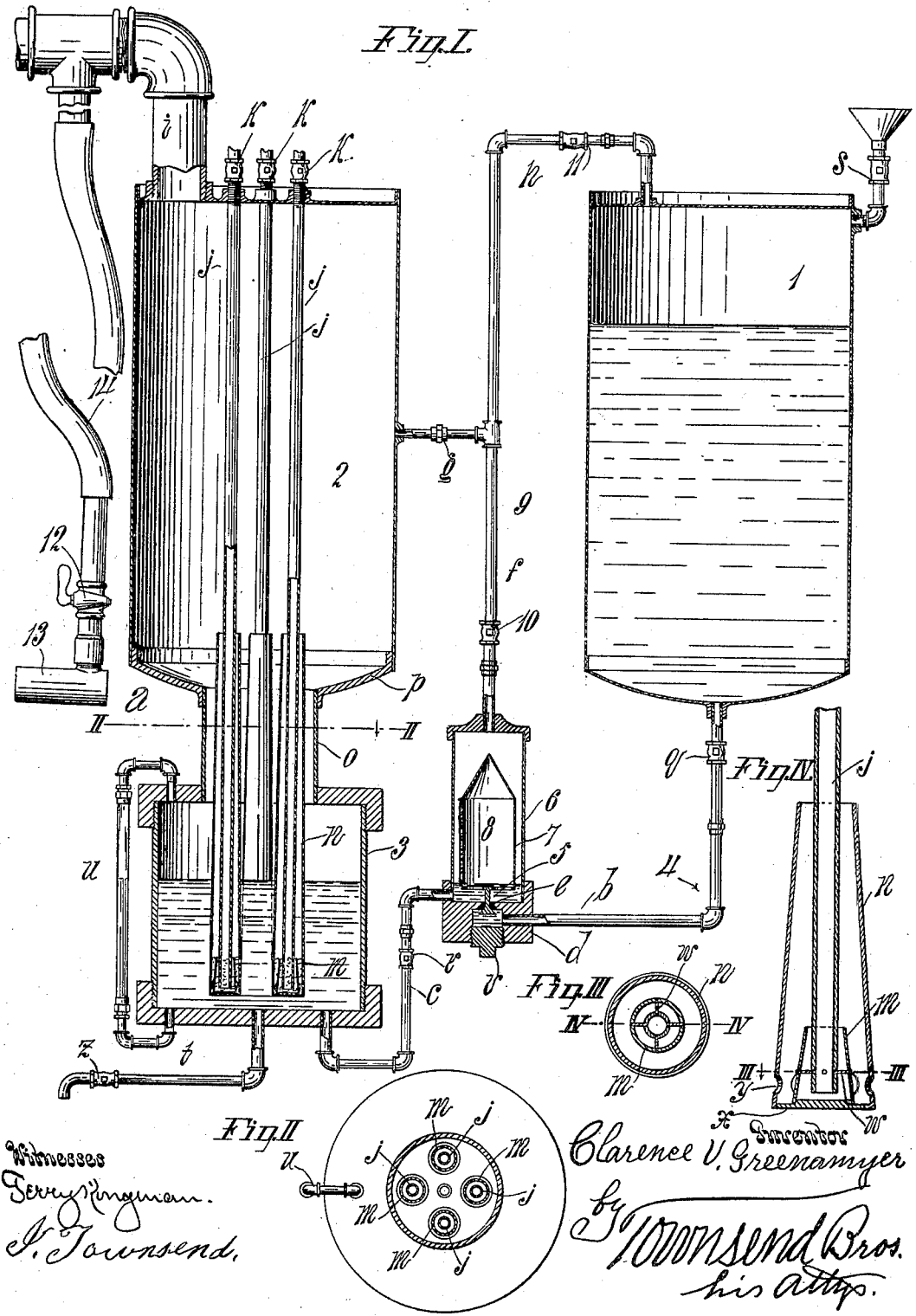

UNITED STATES PATENT OFFICE.

CLARENCE V. GREENAMYER, OF LOS ANGELES, CALIFORNIA, ASSIGNOR OF ONE-HALF TO WILLIAM H. HOLABIRD, OF LOS ANGELES, CALIFORNIA.

CARBURETER.

SPECIFICATION forming part of Letters Patent No. 688,776, dated December 10, 1901.

Application filed December 28, 1900. Serial No. 41,387. (No model.)

*To all whom it may concern:*

Be it known that I, CLARENCE V. GREENAMYER, a citizen of the United States, residing at Los Angeles, in the county of Los Angeles and State of California, have invented new and useful Improvements in Gas-Machines, of which the following is a specification.

This invention relates to a gas-machine for the manufacture of gas from the by-product produced in the manufacture of compressed gas under the Pintsch system. The machine is also adapted for volatilizing gasolene and other volatile hydrocarbons.

An object of this invention is to produce a uniform hydrocarbon vapor of superior heating qualities and to utilize the largest possible percentage of the hydrocarbon liquid.

By my invention I am able to produce from liquid hydrocarbons a practically fixed gas of constant quality which will not condense under ordinary temperatures and which will give and maintain a blue blast-flame with a light tinge which produces the greatest number of heat units to be obtained from hydrocarbon gas. I am also able to volatilize a maximum amount of the hydrocarbon liquid and to reduce the residue to a minimum. In order to accomplish this, it is necessary to avoid any agitation of the liquid which is liable to stir up from the bottom of the liquid body from which the volatile portions are drawn any of the deposit of residue which occurs there; but said deposit is to be drawn off from time to time through a pipe provided for that purpose. It is also necessary that the hydrocarbon liquid be acted upon by the atmospheric air under a comparatively high tension and that it be thereby atomized in a gas-mixing drum which is kept free from the liquid hydrocarbons, which might interfere with producing a gas of the required constituents.

It is necessary in order to accomplish the desired results that the liquid hydrocarbon shall be drawn very near the bottom of the body of such hydrocarbon from which it is to be drawn and that it be atomized in air under a considerable pressure—say fifteen pounds, more or less—and that the condensed air under such pressure shall be thoroughly mixed with the product of the atomizer, but that the hydrocarbon shall at that stage be in suspension in said compressed air to be further attenuated when the mixture is allowed to expand into the open air.

The accompanying drawings illustrate my invention.

Figure I is a sectional elevation of my newly-invented gas-machine. Fragments of the gas main and system are also shown with a burner connected therewith. Fig. II is a plan section on line II II, Fig. I. Fig. III is a plan section on line III III, Fig. IV. Fig. IV is a vertical section on line IV IV, Fig. III, showing the atomizing-nozzle of the compressed-air-supply pipe.

1 indicates a liquid-supply tank.

*a* indicates in a general way a vaporizing and mixing and liquid-condensing apparatus.

2 indicates the gas-mixing and liquid-condensing drum forming part of said mixing apparatus. 3 indicates a liquid-well below said drum and communicating therewith and forming another part of the vaporizing, mixing, and liquid-condensing apparatus.

4 indicates a supply-conduit to allow liquid to flow by gravity from the liquid-supply tank to the liquid-well. This supply-conduit is composed of three parts *b*, *c*, and *d*. 5 indicates a supply-regulating valve to control the flow through said supply-conduit. The valve 5 is located between the members *b* and *c* of the pipe 4.

*d* indicates a fitting connecting the members *c* and *b* and forming a seat for the valve 5 to open and close communication between the members *b* and *c* of the conduit 4.

6 indicates a float-chamber extending upward from the fitting *d* and communicating with the valve passage or seat *e* and the mouth of the member *c* of the conduit 4. 7 indicates a float in said chamber furnished with an air-chamber 8, open at its lower end and operatively connected with the supply-valve 5 to open and close the passage through the conduit as the float 7 falls and rises.

9 indicates a pressure-equalizing line or conduit connecting the valve-chamber with the upper parts of the liquid-supply tank and the gas-mixing drum, respectively. This conduit consists of the three members *f*, *h*, and *g*.

10 indicates a cock for said pressure-equalizing conduit between the valve-chamber 6 and the gas-mixing-drum connection *g*.

11 indicates a cock to control the equalizing-conduit between the liquid-supply tank 1 and the gas-mixing-drum connection *g*.

*i* indicates the gas-main, leading from the top of the gas-mixing drum 2.

*j* indicates an air-supply pipe to deliver compressed air into the vaporizing and mixing apparatus.

In practice it is desirable to employ a plurality of air-supply pipes *j*, each furnished with a cock *k* and all connected with a source of compressed air (not shown) and from which they can be respectively cut off by means of said cock *k*. In the drawings I have shown a machine provided with four air-supply pipes; but it is to be understood that a greater or less number may be used in accordance with the requirements of the work to be done by the machine. Each of the air-supply pipes *j* is furnished with an air-return tube *m*, closed at the bottom and surrounding the mouth of the air-inlet pipe and open at its upper end below the liquid-level in the liquid-well to direct the air escaping from the pipe *j* upward.

*n* indicates an outside casing for the air-supply pipe surrounding the air-return tube *m* and opening into the mixing and condensing drum above the liquid-level of the liquid-well. The mouths of the casings extend into and open into the gas-mixing drum 2.

*o* indicates a contracted tubular connection between the liquid-well 3 and the gas-mixing drum 2. The object of the contracted connection is to prevent the air-current from disturbing the liquid in the liquid-well. The casings *n* extend up through the connection *o*, and the lower end *p* of the drum slopes downward to the connection, so that any liquid of condensation which forms in the mixing-drum 2 will flow back through the connection *o* into the liquid-well 3.

*q* indicates a cock for the member *b* of the conduit 4.

*r* indicates a cock for the member *c* of the conduit 4.

*s* indicates a valved supply-pipe for supplying hydrocarbon liquid to the supply-tank 1.

*t* indicates a valved waste-pipe through which to draw off any residuum that deposits in the liquid-well 3.

*u* indicates a sight-glass to indicate the level of the liquid in the well 3.

The upper end of the valve-float 7 is conical, and said valve-float is cylindrical throughout its lower portion and of considerable length, so that the valve 5 will properly seat.

*v* indicates a plug in the fitting *d* of the conduit 4 to allow access to the valve 5.

The return-tube *m* of the compressed-air-supply pipe is fastened to the air-pipe *j* by pins *w*, and the return member *m* is fastened to a bottom piece *x* by brazing or otherwise and tapers upward therefrom and terminates in a nozzle around the air-pipe below the liquid-level of the well. The casing *n* is brazed or otherwise suitably fastened to the bottom piece *x*, which extends laterally from the bottom of the air-return tube. *y* indicates inlet-holes in the casing *n* below the mouth of the return-tube *m*. The casing tapers upward above the nozzle of the return-tube and ends in a nozzle around the pipe *j*.

In practice to start the machine into operation the valve *z* of pipe *t*, valve 11 of the conduit 9, and the valves *k* of the air-inlet pipes will be closed. Then the liquid will be introduced into the tank 1 through the valved supply-pipe *s*, after which the valve of said pipe will be closed. The valves 10, *q*, and *r* being open, one or more of the valves *k* will be opened to allow the compressed air to enter the machine, thus filling the air-chamber 8 of the valve-float 7 with compressed air at the pressure under which the machine is to be operated. This pressure may be fifteen pounds, more or less, according to the judgment of the attendant and the work to be performed. When the air-chamber 8 has thus been filled, the valve 11 will be opened, thus equalizing the pressure between the supply-tank and the vaporizing and mixing apparatus. This will allow the liquid to flow from the supply-tank 1 under the force of gravity down into the liquid-well 3 and through the hole *y* in the casing until the liquid rises in the well 3 to a height sufficient to lift the valve 7 and close the conduit 4. When any of the cocks 12 of the gas system connected with the main *i* are open to allow the escape of gas, the compressed air will flow through the pipe or pipes *j* and will direct a stream of compressed air up through the nozzle formed by the bottom piece *x*, return-tube *m*, and casing *n*, thus tending to create a vacuum at the lower end of the casing. The liquid will flow into the casing through the holes *y* without any agitating action upon the liquid in the well and will be caught by the air-blast issuing from the nozzle of the air-return tube *m* and will be blown up through the casing *n* and into the top of the gas-mixing drum 2 in the form of a fine vapor. Any liquid of condensation which may form in the drum will flow back, leaving the carbureted air or mixed gas in the drum to pass out through the main *i* to the burner 13. When the liquid in the well falls sufficiently to lower the valve-float 7 to open valve 5, a supply of liquid will flow from the tank, 1 and this supply will be regulated by the rise and fall of the valve-float 7.

It is essential that the valve-float 7 be filled with air at the pressure maintained within the mixing apparatus in order that it will be sensitive to the fluctuations of the liquid in the liquid-well. The gas produced by this machine is of such a perfect character that a rubber tube 14 can be used with perfect safety to conduct the gas to the burner, and there is no danger that the tube will be subject to the action of liquid hydrocarbons condensed out of the gas, for such condensation does not occur under ordinary conditions in the gas system.

The purpose of furnishing the vaporizing and mixing apparatus with a plurality of compressed-air-supply pipes $j$ is to allow the machine to be operated to produce the required gas for the operation of a greater or less number of burners, as may be required.

In practice preferably the compressed-air pipe $j$ will be quarter-inch pipe and the width of the outlet of the nozzle $m$ is preferably about one-eighth of an inch around the pipe $j$—that is to say, the inside diameter of the nozzle of the air-return tube $m$ is preferably about one-eighth of an inch larger than the outside diameter of the one-fourth-inch compressed-air-supply pipe, and the inside diameter of the nozzle of the casing $n$ is preferably about one-fourth of an inch larger than the outside diameter of the air-pipe $j$. For this size of atomizer the holes $y$ at the bottom of the tapering casing $n$ will be about one-fourth inch. Such holes will be sufficient in number and size to readily supply the liquid required without producing any strong current in the well. It is to be understood, however, that I do not limit the invention to any specific dimensions.

By means of the construction shown the liquid is drawn from the lower part of the well and is vaporized without materially disturbing the body of liquid in the liquid-well.

The tapering form of the tube $m$ and casing $n$ of the atomizer of the air-pipe serves to increase the effective action of said atomizer in the operation of breaking up and injecting into the drum the volatile liquid.

The quality of the gas produced by the use of a nozzle of given dimensions under a given pressure will remain constant.

As the amount of gas taken from the main increases or decreases it becomes necessary within certain limits to increase or decrease the supply of compressed air. This is done by opening or closing one or more of the valves $k$ as occasion requires.

It is to be understood that in the operation of this apparatus the compressed air will not fully expand until it reaches the open upper ends of the pipes $m$, which open upper ends are inside the gas mixing and vaporizing apparatus, and that liquid which is drawn up from the bottom of the pipes $m$ is not vaporized until such vaporization takes place by reason of the sudden expansion of the compressed air at the upper open ends or mouths of the pipes $m$, respectively, which therefore operate at that point as atomizers. The incoming air is never in any way released inside of the well 3 or below the level in said well, but is always released to expand in the vapor within the drum, and it expands in close combination with the liquid which it is carrying, and therefore takes up said liquid and produces the required atomization necessary for a thorough mixture which will then take place within the drum above the discharge-mouths of the air-return tubes or atomizers $n$.

The surface of the liquid within the well remains undisturbed throughout the process, and no portion of it is subjected to the action of the expanding air, and the amount of liquid which is subjected to such expanding air is in direct proportion to the flow of air. Although there is a slight expansion of the air within the pipe $n$, it is not sufficient to vaporize or atomize the liquid, and the atomizing effect is only produced in the drum 2.

What I claim, and desire to secure by Letters Patent of the United States, is—

1. A gas-machine comprising a liquid-supply tank; a gas-mixing drum; a liquid-well below said drum; a contracted tubular connection between said well and drum and communicating therewith; a supply-conduit to allow liquid to flow by gravity from the liquid-supply tank to the liquid-well; a float-chamber communicating with said conduit; a supply-regulating valve to control the flow through said supply-conduit; a float in said chamber furnished with an air-chamber open at its lower end and operatively connected with the supply-valve to open and close the passage through the conduit; a pressure-equalizing conduit connecting the valve-chamber with the upper parts of the liquid-supply tank and the gas-mixing drum, respectively; a cock for said pressure-equalizing conduit between the valve-chamber and the gas-mixing-drum connection; a cock in said conduit between the liquid-supply tank and gas-mixing-drum connection; a cock to control the supply-conduit between the liquid-supply tank and the float-valve; a cock to control the supply-conduit between the float-valve and the gas-mixing-drum connection; a gas-main leading from the gas-mixing drum; an air-supply pipe to deliver compressed air into the liquid-well below the liquid-level thereof; an air-return tube closed at the bottom and surrounding the mouth of the air-inlet pipe, and open at its upper end below the liquid-level in the liquid-well; and an outside casing surrounding the air-return tube, and opening above said liquid-level to discharge compressed air and liquid from the well into the vapor in the gas-mixing drum, and furnished below said liquid-level with inlets.

2. In a gas-machine, the combination with a vaporizing and mixing apparatus furnished with an atomizer; of a liquid-supply tank; a float-chamber; a supply-conduit to conduct liquid from the liquid-supply tank to the vaporizing and mixing apparatus, and communicating with the float-chamber; an equalizing-valve to control said conduit between the supply-tank and the float-chamber; a float in said float-chamber connected with the equalizing-valve to operate the same and furnished with a downwardly-opening air-chamber; a pressure-equalizing conduit connecting the float-chamber, the liquid-supply tank and the vaporizing and mixing apparatus above the liquid-level within said apparatus; and means for introducing compressed air into the vaporizing and mixing apparatus through the atomizer thereof.

3. The combination of a gas vaporizing and mixing apparatus; a liquid-supply tank; a conduit leading from the bottom of the liquid-supply tank to the bottom of the mixing and vaporizing apparatus; an equalizing-valve for controlling the flow through said conduit to maintain the liquid in the vaporizing and mixing apparatus at a regulated depth; a float to control said valve; a chamber for said float; and a pressure-equalizing conduit communicating between the equalizing-valve float-chamber, the upper part of the vaporizing and mixing apparatus and the upper part of the liquid-supply tank.

4. In a gas-machine, the combination of a liquid-well; a gas-mixing and liquid-condensing drum above the liquid-well and connected therewith; means for maintaining a body of liquid at a practically constant level in the liquid-well; a compressed-air-supply pipe extending down into the liquid-well and furnished with a return air-tube, the lower end of said tube being closed and the upper end terminating in a nozzle around said pipe; and a casing fastened to said return-tube and furnished with inlet near the bottom and extending up above the mouth of the return-tube and terminating in a nozzle around said pipe above the liquid-level of the well.

5. In a gas-machine, the combination of a compressed-air-supply pipe; an air-return tube fastened to the lower end of said pipe and extending up and terminating in a nozzle around said pipe; a bottom piece fastened to said return-tube; a casing fastened to said bottom piece and extending up above the nozzle of the air-return tube and terminating in a nozzle around said pipe and furnished with perforations near said bottom piece.

6. In a gas-machine, the combination of a supply-tank; a vaporizing and mixing apparatus furnished with a liquid-well and with a gas-drum, and also furnished with a compressed-air-supply pipe and vaporizing-nozzle; a conduit leading downward from the lower part of the supply-tank and opening into the lower part of the liquid-well; a valve in said conduit to open and close the same; a float-chamber communicating with said conduit to receive liquid therefrom and communicating with the upper part of the mixing apparatus to receive fluid-pressure therefrom; and a conduit connecting the upper part of the liquid-supply tank with the interior of the vaporizing and mixing apparatus.

7. The combination with the vaporizing and mixing apparatus comprising an atomizing-nozzle; of a supply-tank; a conduit connecting the supply-tank with the mixing apparatus to supply the same with a volatile liquid; a float-valve for controlling said conduit; a chamber for the float of said valve; and an equalizing-conduit communicating between the upper parts of the supply-tank, vaporizing and mixing apparatus and valve-chamber.

8. In a gas-machine, the combination with a compressed-air-supply pipe; of an air-return tube fastened to the lower end of said pipe and tapering upward and terminating in a nozzle around said pipe; a bottom piece fastened to said return-tube and extending outward therefrom; a casing fastened to said bottom piece and tapering upward therefrom to a point above the nozzle of the air-return tube, and terminating in a nozzle around said pipe and furnished with perforations below the level of the nozzle of the air-return tube.

In testimony whereof I have signed my name to this specification, in the presence of two witnesses, at Los Angeles, California, this 22d day of December, 1900.

C. V. GREENAMYER.

Witnesses:
JAMES R. TOWNSEND,
F. M. TOWNSEND.